US011544334B2

(12) United States Patent
Gottumukkala et al.

(10) Patent No.: US 11,544,334 B2
(45) Date of Patent: Jan. 3, 2023

(54) CONTEXT-BASED NATURAL LANGUAGE SEARCHES

(71) Applicant: Amazon Technologies, Inc., Seattle, WA (US)

(72) Inventors: Ramakanthachary Gottumukkala, Sammamish, WA (US); Zachary Thomas Crowell, Redmond, WA (US); Leon Portman, Givatayim (IL)

(73) Assignee: Amazon Technologies, Inc., Seattle, WA (US)

( * ) Notice: Subject to any disclaimer, the term of this patent is extended or adjusted under 35 U.S.C. 154(b) by 174 days.

(21) Appl. No.: 16/712,899

(22) Filed: Dec. 12, 2019

(65) Prior Publication Data

US 2021/0182350 A1    Jun. 17, 2021

(51) Int. Cl.
*G06F 16/9532* (2019.01)
*G06F 16/9032* (2019.01)
(Continued)

(52) U.S. Cl.
CPC .... *G06F 16/9532* (2019.01); *G06F 16/90332* (2019.01); *G06F 16/9535* (2019.01);
(Continued)

(58) Field of Classification Search
CPC .......... G06F 16/90332; G06F 16/9532; G06F 16/9535; G06F 16/9537; G06F 16/9538;
(Continued)

(56) References Cited

U.S. PATENT DOCUMENTS

| 2008/0168052 A1* | 7/2008 | Ott | G06F 16/951 |
| | | | 707/999.005 |
| 2011/0066613 A1* | 3/2011 | Berkman | G06F 16/40 |
| | | | 707/E17.014 |

(Continued)

OTHER PUBLICATIONS

PCT International Search Report and Written Opinion, PCT/US2020/062012, dated Mar. 16, 2021, 15 pages.

(Continued)

*Primary Examiner* — Robert W Beausoliel, Jr.
*Assistant Examiner* — Nirav K Khakhar
(74) *Attorney, Agent, or Firm* — Kilpatrick Townsend & Stockton LLP

(57) ABSTRACT

Techniques for natural language searches are described. In an example, a computer system receives a search associated with a computing device. Based on the search, the computer system determines first search results from a first data source and associated with a first type and second search results from a second data source and associated with a type. The computer system also determines a context associated with at least one of the computing device or a user. Based on the context, the computer system generates instructions associated with a presentation of the first search results and the second search results at a user interface of the computing device. The instructions indicate a first presentation order of the first search results and the second search results and a second presentation order of search results within the first search results. The computer system sends the instructions to the computing device.

20 Claims, 10 Drawing Sheets

(51) Int. Cl.
*G06N 20/00* (2019.01)
*G06F 16/9535* (2019.01)
*G06F 16/9537* (2019.01)
*G06F 16/9538* (2019.01)

(52) U.S. Cl.
CPC ...... *G06F 16/9537* (2019.01); *G06F 16/9538* (2019.01); *G06N 20/00* (2019.01)

(58) Field of Classification Search
CPC ............ G06F 16/24578; G06F 16/245; G06F 16/248; G06F 16/338; G06F 16/438; G06F 16/538; G06F 16/638; G06F 16/738; G06F 16/838; G06F 16/9038; G06N 20/00
See application file for complete search history.

(56) References Cited

U.S. PATENT DOCUMENTS

| | | | |
|---|---|---|---|
| 2014/0046950 A1* | 2/2014 | Zelek | G06F 16/24557 707/741 |
| 2017/0178626 A1 | 6/2017 | Gruber et al. | |
| 2017/0242886 A1 | 8/2017 | Jolley et al. | |
| 2018/0052885 A1 | 2/2018 | Gaskill et al. | |
| 2018/0349485 A1* | 12/2018 | Carlisle | G06F 16/958 |
| 2019/0303175 A1* | 10/2019 | Irani | G06F 9/44521 |
| 2021/0089593 A1* | 3/2021 | Nixon | G06F 16/90348 |

OTHER PUBLICATIONS

PCT/US2020/062012, "International Preliminary Report on Patentability", dated Jun. 23, 2022, 11 pages.

* cited by examiner

CONTEXT-BASED NATURAL LANGUAGE SEARCHES

BACKGROUND

As voice recognition technology improves, systems that employ such technology continue to proliferate. Some systems employ what is referred to as near-field voice recognition where a user speaks into a microphone located on a hand-held device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can be used to perform searches. A speech input can be received at one of such devices and a search result can be presented as a speech output by the device.

BRIEF DESCRIPTION OF THE DRAWINGS

Various embodiments in accordance with the present disclosure will be described with reference to the drawings, in which.

DETAILED DESCRIPTION

Figure 1:
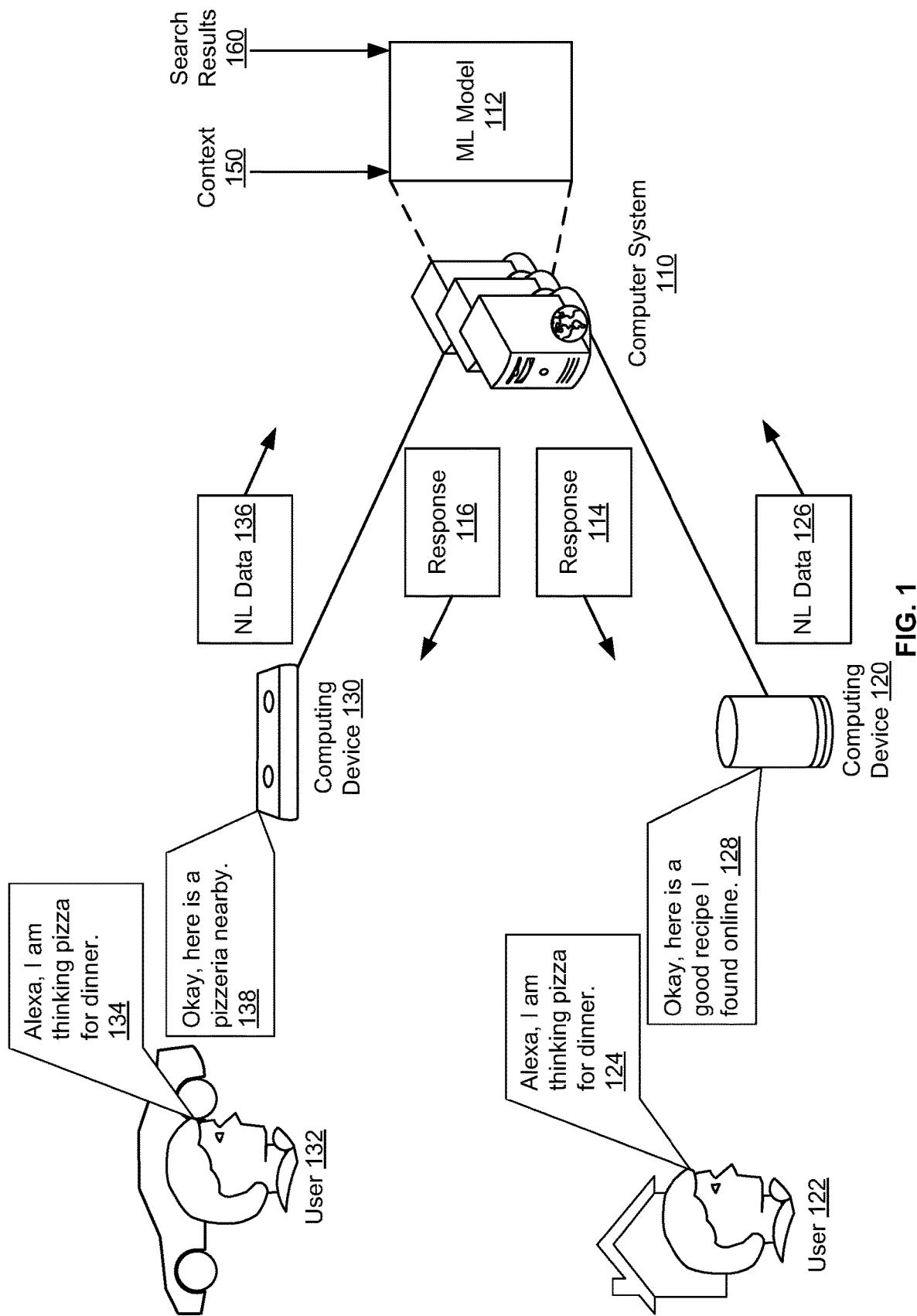
FIG. 1 illustrates an example of a computing environment for natural language searches, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed, among other things, to natural language searches. In an example, a computing device may receive a user's natural language input at a user interface and may send data corresponding to this input to a computer system. The natural language input may include a search for data available from multiple data sources. Each of the data sources may provide search results having a particular type. For instance, one data source may provide search results about web content, while another data source may provide search results about applications that can be downloaded to and/or enabled for the computing device. The computer system may perform natural language processing on the data to complete a semantic understanding of the natural language input. The semantic understanding may include determining search words and a search intent. Further, the computer system may perform a contextual understanding to determine a context of the device and/or the user. Based on the search intent, the computer system may select a subset of the data sources and may use the search words to query this subset. Upon receiving the search results, the computer system may determine whether to feature them based on the context(s) and may generate instructions for presenting some or all of the results based on which are to be featured. The instructions along with the featured search results may be sent to the computing device or a different computing device for presentation at the same or a different user interface. In an example, one or more machine learning (ML) models may be implemented. The input to the ML model(s) may include the search results and the context. An output(s) of the ML model(s) may include a ranking of the search results and an indication of the total number of search results that are to be presented.

To illustrate, consider an example of a smart speaker as a computing device, where the smart speaker hosts a personal assistant application. Upon a trigger word (e.g., "Alexa"), functionalities of the personal assistant application may be triggered. A user of the smart speaker may utter the words "Alexa, I am thinking pizza for dinner." Upon detecting the trigger word, the smart speaker may send natural language data that includes some or all of the utterance (e.g., "I am thinking pizza for dinner") to the computer system. In turn, the computer system may determine "pizza" as a search word and "shopping" intent. The computer system may determine that the device supports a voice-based interface and may be located in a vehicle. The computer system may also determine that the user may have searched for nearby restaurants in the last five minutes. Accordingly, the computer system may determine that search results for pizza restaurants nearby the smart speaker's location (or, equivalently, the user's location or the vehicle's location) may be of most interest to the user and that only two search results should be presented given the voice-based interface. Hence, rather than presenting multiple search results, some for pizza restaurants that may not be nearby, some for pizza recipes, or some for a pizza application that may be enabled for the smart speaker to order pizza from a particular pizza chain, the computer system may instruct the smart speaker to present the search results for the two closest pizza restaurants.

Embodiments of the present invention provide various technical advantages related to natural language searches via computing device. In particular, the processing latency between the time a natural language search is received and the time search results are surfaced may be reduced by querying particular data sources, rather than all available data sources, given a semantic understanding of the natural language input. Further, the functionalities and usability of the user interface may be significantly improved by surfacing featured results given a contextual understanding of the natural language input. For instance, a voice-based interface that presents a large number of search results (e.g., in the tens, if not hundreds or thousands) may not be functionally usable. In contrast, the embodiments may allow a presentation of only a few featured results (e.g., less than five) and allow the user to request additional results as needed.

In the interest of clarity of explanation, embodiments of the present disclosure are described in connection with natural language searches for items and providing search results including offers about the items, as part of a computer environment that enables shopping online and brick and mortar stores for which online data may be available. However, the embodiments are not limited as such and may similarly apply to searches for any type of data. Generally, different data sources may be searched to determine search results. Each of such data source may be associated with a type of search results. Semantic and contextual understandings may be used to determine the most relevant data sources and featured results to then generate and send instructions to computing devices about the presentation of such results.

FIG. 1 illustrates an example of a computing environment for natural language searches, according to embodiments of the present disclosure. The computing environment may include a computer system 110 and a plurality of computing devices, such as a computing device 120 and a computing device 130. The computer system 110 may receive natural language (NL) data from the plurality of computing devices indicating user searches, perform semantic and contextual understandings of the NL data, and send responses to the plurality of computing devices. The responses may include search results and instructions for presenting the search results. Whereas the user searches may be for offers about items, the search results may be presented as offer recommendations and/or item recommendations. An item may be a tangible item (e.g., a physical product) or an intangible item (e.g., software code that can be made available to the computing devices).

In an example, the computer system 110 may represent a set of hardware servers and/or virtualized servers hosted within hardware systems. The computer system 110 may implement various components to perform the semantic and contextual understandings, as further illustrated in FIG. 2. The components may include an ML model 112. For each NL data corresponding to a user search and received from a computing device, the computer system may input a context 150 and search results 160 to the ML model 112. The ML model 112 may be trained to output a ranking of the search results and, optionally, a total number of the search results that is to be presented. The computer system 110 may generate instructions about the presentation of the search results given the ranking and the total number and may send such instructions in a response to the same and/or a different computing device. although FIG. 1 describes a single ML model 112, more than one ML model may be used as described in connection with the next figures.

The context 150 may be associated with the computing device and/or a user of the computing device. As used herein, a "device context" may refer to a context specific to a computing device, a "user context" may refer to a context specific to a user, and a "context" may refer to a context specific to the computing device and/or the user. A context may include data indicating a condition, a setting, an activity and/or environment of the computing device and/or user as applicable. For instance, the device context may include a geographical location, a network location (e.g., internet protocol (IP) address), a type of device, a type of user interface of the device, and/or other data about the computing device. The user context may include a geographic location, a profile, a recent search activity (e.g., recent defined in terms of a predefined time period from receive the applicable NL data), a search history, a browse history, a user-defined list of items (e.g., a list that includes items of interest to the user and that may be used as a starting list, as a reference list, and/or as a target list to look for information about the items and/or add the items to an acquisition process), and/or other activities of the user.

The search results 160 may be provided from multiple data sources in response to one or more queries of the computer system 110. Each of such data sources may be associated with a search result type. A search result type may indicate a type of search results available from a data source, where the search results may include offers about items based on the data stored in the data source. For instance, a first data source may include an electronic platform that stores a catalog of items available from the electronic platform. The catalog may represent a data structure storing data about the items and about processes to acquire the items (e.g., acquisition processes). Such data is usable in connection with a computing service of the electronic platform, where the computing service may retrieve the search results based on the data and trigger an item acquisition process, where the search results include offers from the catalog, where the item acquisition process may be executed to obtain one or more of the items. The search results from the electronic platform may include a portion of the data. In particular, search results about an offer for an item may include the item identifier, description, features, supplier, an item acquisition process, and the like. A second data source may include an application store storing applications that may be downloaded and/or enabled for a computing device. In particular, an application can be available to obtain an item from the electronic platform (e.g., to trigger the relevant acquisition process) or from a different item source (e.g., in which case, the application may be developed specifically for the different item source, such as by a merchant). Search results about an application may include an offer to download or enable the application, where this offer may include an identifier of the application, reviews of the application, a description of the application, and a link to download and/or enable the application. A third data source may include web sites storing online data, such as web content. In particular, a web site may store data about an entity (e.g., a brick and mortar store at a particular geographic location) that offers items. A search result about an offer for an item may include online data about the entity, its geographic location, contact information, data about the item, and the like. A fourth data source may return sponsored results that include predefined offers. For instance, a search result may identify an entity and a discount or a particular feature of an item that is available from the entity. Other data sources may be possible, such as a social media platform providing social media messages (e.g., messages offering items from difference sources), and the like.

A computing device, such as each of the computing devices 120 and 130, may include a suitable memory(ies) storing computer-readable instructions and a suitable processor(s) for executing the computer-readable instructions. The computer-readable instructions may represent program code of an application to interface with the computer system 110, such as a personal assistant application. The application may support user interface at the computing device, among other functionalities, where the user interface may receive natural language input and/or present natural language output. For instance, the user interface may include a voice-based interface that may receive natural language utterance of a user detected via a microphone and may play a natural language response of the computer system 110 via a speaker. In this case, the application may detect a wakeword (e.g., "Alexa") from a natural language utterance and generate NL data that includes some or all of the natural language utterance. The computing device may send the NL data to the computer system 110 and may receive back a response. The application may present a text-to-speech (TTS) message based on the response. The user interface may also include a graphical user interface that may receive text in a natural language format.

In an example, the computing device 120 may be operated by a user 122. In particular, the computing device 120 may be registered to a user account of the user 122. The registration data may indicate a geographic location of the device (e.g., a home address) and a space at that location (e.g., kitchen). Upon receipt of a natural language utterance 124 of the user 122 (shown in FIG. 1 as "Alexa, I am thinking pizza for dinner"), the computing device 120 may detect the wakeword (e.g., "Alexa") and may generate and send NL data 126 to the computer system 110. The NL data 126 may include at least a portion of the natural language utterance 124 (e.g. "I am thinking pizza for dinner").

The computer system 110 may perform natural language processing on the NL data 126 and determine "pizza" as a search word and "shopping" intent. Based on this intent, the computer system 110 may query the application store for applications for ordering pizzas from pizza restaurants, web sites about pizza restaurants, web sites about pizza recipes, and the electronic platform for ordering pizza ingredients. The computer system 110 may also determine a device context of the computing device 120, where this context may indicate that the device is in a kitchen within a house and has a voice-based interface. Based on the user account, the computer system 110 may also determine a user context of the user 122 indicating a profile of the user 122, including the user's 122 preferences, browse history, and search history and that the user 122 searched for recipes for different types of food within the last five minutes. The search results received from the different sources, the device context, and the user context may be input to the ML model 112. The ML model 112 may output data indicating that the search results about pizza recipes are likely to be of most interest, followed by the search results for ordering pizza ingredients, the search results for pizza restaurants, and finally the search results for pizza applications. The computer system 110 may send a response 114 to the computing device 120 to present only the first pizza recipe. Accordingly, the computing device 120 may play a TTS message 128 (shown in FIG. 1 as "Okay, here is a good recipe I found online").

In comparison, the computing device 130 may be operated by another user 132. Its registration information under a user account of the user 132 may indicate that the computing device 130 is installed in a vehicle. A similar natural language utterance 134 may be received from the user 132 (shown in FIG. 1 as "Alexa, I am thinking pizza for dinner"). Accordingly, the computing device 130 may send similar NL data 136 to the computer system 110 (e.g., "I am thinking pizza for dinner").

Here, also the computer system 110 may perform natural language processing on the NL data 136, determine "pizza" as a search word and "shopping" intent, query the same data sources, and receive the same search results. The computer system 110 may also determine a device context of the computing device 130, where this context may indicate that the device is in a vehicle and the current geographic location of the computing device 130, and that the computing device 130 has a voice-based interface. Based on the user account, the computer system 110 may also determine a user context of the user 132 indicating a profile of the user 132 and that the user 132 searched for recipes for nearby restaurants within the last five minutes. The search results, the device context, and the user context may be input to the ML model 112. The ML model 112 may output data indicating that the search results about nearby pizza restaurants are most likely of interest, followed by the results for ordering pizza ingredients, the search results for pizza recipes, and finally the search results for pizza applications. The computer system 110 may send a response 116 to the computing device 130 to present the search result about only the nearest pizza restaurant. Accordingly, the computing device 130 may play a TTS message 138 (shown in FIG. 1 as "Okay, here is a pizzeria nearby").

As illustrated in the above example, similar or the same search results may be received based on the similar natural language utterances 124 and 134. However, the presentation of the search results may vary significantly based on the device contexts and/or the user contexts. Accordingly, by using contextual understanding and semantic understanding, the usability of the personal assistant application and of the voice-based interface to perform natural language searches may be substantially improved.

Although FIG. 1 and other figures of the present disclosure illustrate that natural language processing may be performed remotely from a computing device of a user, embodiments of the present disclosure are not limited as such. For instance, and depending on the processing capability and configuration of a computing device of a user, the natural language processing may be performed locally on the computing device to determine search words and a search intent. Such words and search intent may be sent to the computer system 110 instead of the NL data. In this way, the overall processing latency may be reduced.

Figure 2:
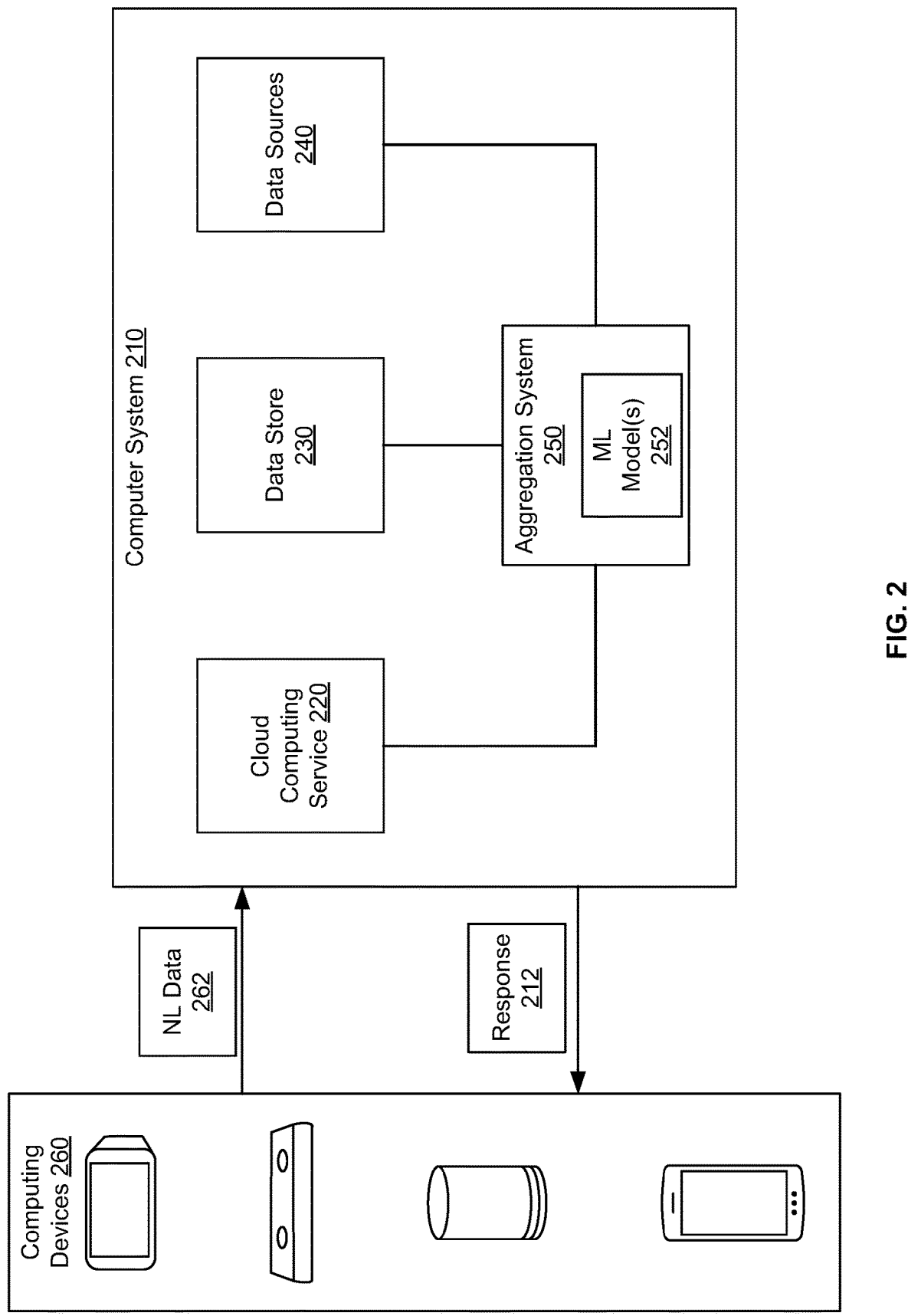
FIG. 2 illustrates an example of components of a computer system communicatively coupled with computing devices and facilitating natural language searches, according to embodiments of the present disclosure.

FIG. 2 illustrates an example of components of a computer system 210 communicatively coupled with computing devices 260 and facilitating natural language searches, according to embodiments of the present disclosure. The computer system 210 may be an example of the computer system 110 of FIG. 1 and any of the computing devices 260 may be an example of the computing device 120 or 130 of FIG. 1. As illustrated, any of the computing devices 260 may send NL data 262 to the computer system 210 and may receive a response 212 from the computer system 210. The NL data 210 may correspond to a natural language input, whether uttered and detected via a microphone or input as text at a graphical user interface (GUI). The response 212 may include search results and instructions for presenting the search results, where some or all of the search results may include offers about items.

In an example, the computer system 210 may include a cloud computing service 220, a data store 230, data sources 240, and an aggregation system 250. The aggregation system 250 may interface with the cloud computing service 220, the data store 230, and the data sources 240 and may host one or more ML model(s) 252. Each one of the ML(s) model 252 may be an example of the ML model 112 of FIG. 1.

The cloud computing service 220 may perform natural language processing on the NL data 262. The natural language processing may include automatic speech recognition (ASR) and natural language understanding (NLU) to determine an intent (e.g., intent: shopping) and words related to the intent. The cloud computing service 220 may also output a device context and a user identifier.

The data store 230 may include one or more databases storing data relevant to users. Any such data is stored according to explicit permissions of the users and the users retains control over the use of the data. The data may indicate user contexts. For instance, the data store 230 may store, in association with user identifiers, user profiles including preferences, browse histories, search histories, search activities within a predefined time period (e.g., the last five minutes, the last set of search activities), interactions with previous search results, and/or other activities.

The data sources 240 may represent computing resources storing data about offers and from which search results can be retrieved and can include some for the offers. In an example, the data sources 240 may an electronic platform, an application store, web sites, and social media platforms. Although shown as being components of the computer system 210, some and/or of the data sources 240 may instead be remote from and accessible to the computer system 210. One or more search engines may be available to retrieve the search results. For instance, the computer system may invoke a single search engine to query the various data sources 240 and/or may invoke a search engine for each one of the data sources 240.

The aggregation system 250 may represent computing resources for aggregating the search results and generating instructions to present them. The search results may be presented as recommended item offers and/or features items. For instance, the aggregation system 250 may receive the search words, search intent, device context, and user identifier from the cloud computing service 220. Based on the search intent, the aggregation system 250 may select particular ones of the data sources 240 and may use the search words to query the selected data sources. The aggregation system 250 may also query the data store 230 using the user identifier to determine a user context. The search results, device context, and user context may be input to the ML model(s) 252. An output of the ML model(s) 252 may indicate rankings of the search results and, optionally, the total number of search results to present. Based on this output, the aggregation system 250 may determine a subset of the results to send in the response 212 and may generate the relevant presentation instructions.

In an example, the aggregation system 250 may host multiple ML models. Each model may be trained for a particular intent, a set of items, and/or a set of data sources. For instance, a first ML model may be trained particularly for grocery shopping, whereas a second ML model may be trained particularly for fashion shopping. Hence, if the natural language processing of the NL data 262 indicates an intent to shop grocery items, the first ML model may be used to rank search results about grocery offers. If the natural language processing of the NL data 262 indicates an intent to shop clothing items, the second ML model may be used to rank search results about clothing offers. Of course, if the natural language processing of the NL data 262 indicates an intent to shop f grocery items and clothing items, both ML models may be used. In this example, the aggregation system 250 may store data associations between the ML models with their use (e.g., that an ML is usable given an intent, a set of items, a set of data sources). Upon receiving the output of the cloud computing service 220, the aggregation system 250 may select one or more of the ML models based on a match between the output and the associations.

The computing device 260 may be of different types and support different input/output (I/O) modalities. Some of the computing devices 260 may support GUIs, whereas other ones may support voice-based interfaces. As illustrated, the computing devices 260 include a personal assistant device having a GUI, a personal assistant device that may be installed in a vehicle, a smart speaker, and a smartphone. Other types of devices may be possible, including internet of things (IoT) devices.

The NL data 262 may be received from one of the computing devices 260 (e.g., a source device). The response 212 may be sent to the same computing device and/or to a different computing device (e.g., a destination device). If the response 212 is to be sent to a different computing device, the device context may include the context of the source device and/or the context of the destination device.

Figure 3:
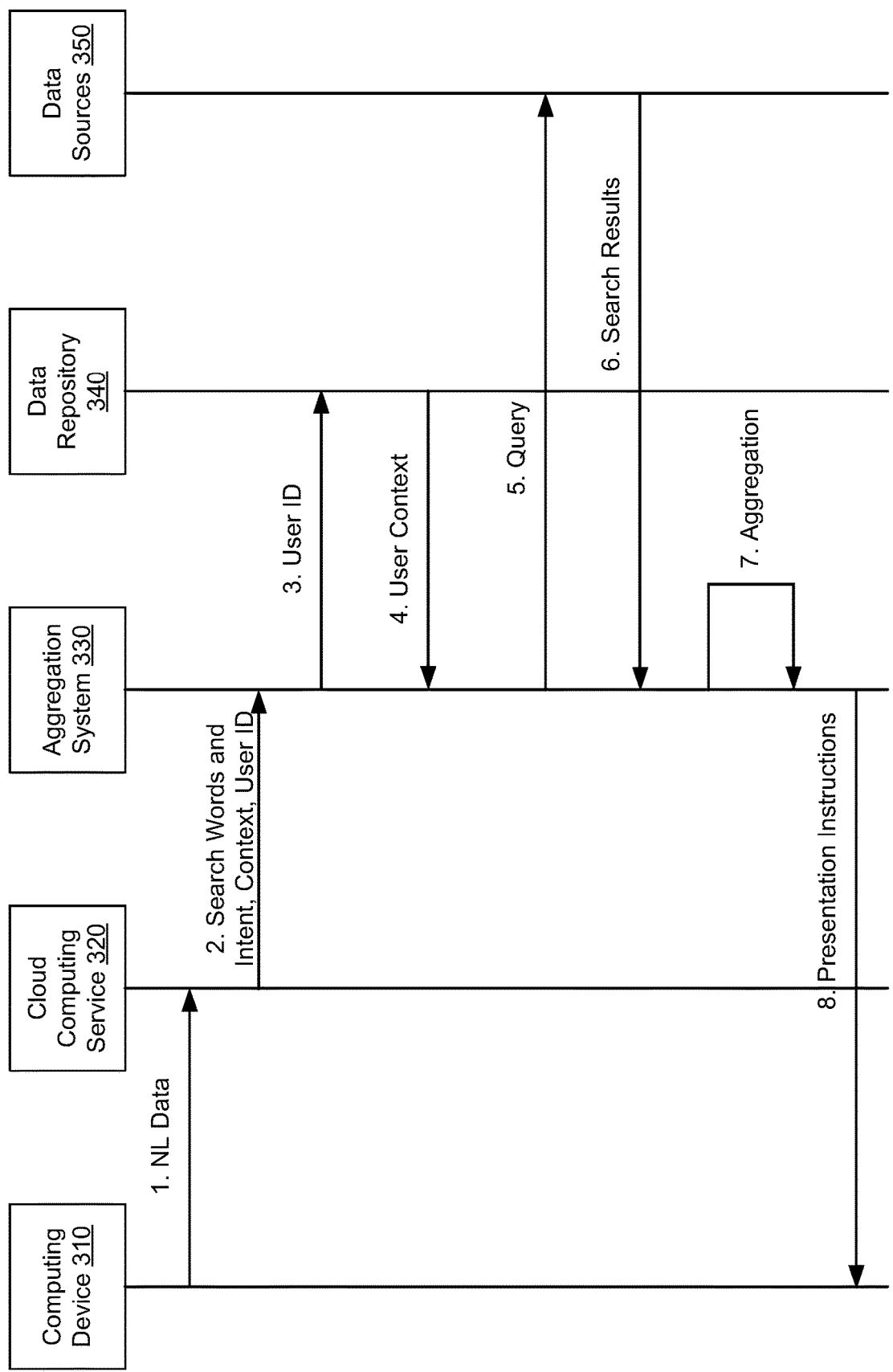
FIG. 3 illustrates an example of a sequence diagram for natural language searches, according to embodiments of the present disclosure.

FIG. 3 illustrates an example of a sequence diagram for natural language searches, according to embodiments of the present disclosure. The natural language searches may be facilitated by a computing device 310 communicatively coupled with a computer system, such as the computer system 210 of FIG. 2. In particular, the computer system may include a cloud computing service 320, an aggregation system 330, a data repository 340, and data sources 350.

As illustrated, a first step of the sequence diagram may include a transmission of NL data from the computing device 310 to the cloud computing service 320. In response, the cloud computing service 320 may determine one or more search words, a search intent, a device context, and a user identifier. In a second step of the sequence diagram, the cloud computing service 320 may send such data to the aggregation system 330.

In a third step of the sequence diagram, the aggregation system 330 may query the data repository 340 by using the user identifier in the query. The data repository 340 may determine a user context from data stored in association with the user identifier. In a fourth step of the sequence diagram, the data repository 340 may return the user context to the aggregation system 330.

In a fifth step of the sequence diagram, the aggregation system 330 may send one or more queries to the data sources 350. The fifth step may be performed prior to, in parallel to, or after the third step. The one or more queries may include the search words. In an example, the aggregation system 330 may query all the available data sources 350 independently of the search intent. In another example, the aggregation system may select particular data sources based on the intent and query the selected data sources. For instance, each of the data sources 350 may be associated with one or more search intents and such associations may be stored in a look-up table. The aggregation system 330 may identify the particular data sources by determining matches between the search intent and the search intents stored in the look-up table.

In a sixth step of the sequence diagram, the queried data sources may return search results to the aggregation system 330. Each of the search result may be associated with a search result type.

In a seventh step of the sequence diagram, the aggregation system 330 may aggregate the search results. The aggregation may include logically grouping the search results, determining which groups are to be featured and the which result within each group to feature, determining the total number of search results to present per group and the total number of groups to present, and generating presentation instructions based on the results.

In an eighth step of the sequence diagram, the aggregation system 330 may send the presentation instructions to the computing device 310. In addition, the aggregation system may send the featured results. The presentation instructions may identify their grouping and the order in which these search results are to be presented.

Figure 4:
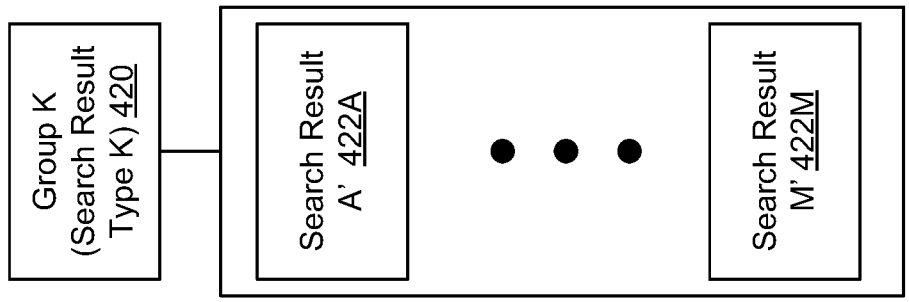
FIG. 4 illustrates an example of associating search results with groups based on types of the search results, according to embodiments of the present disclosure.
Figure 4:
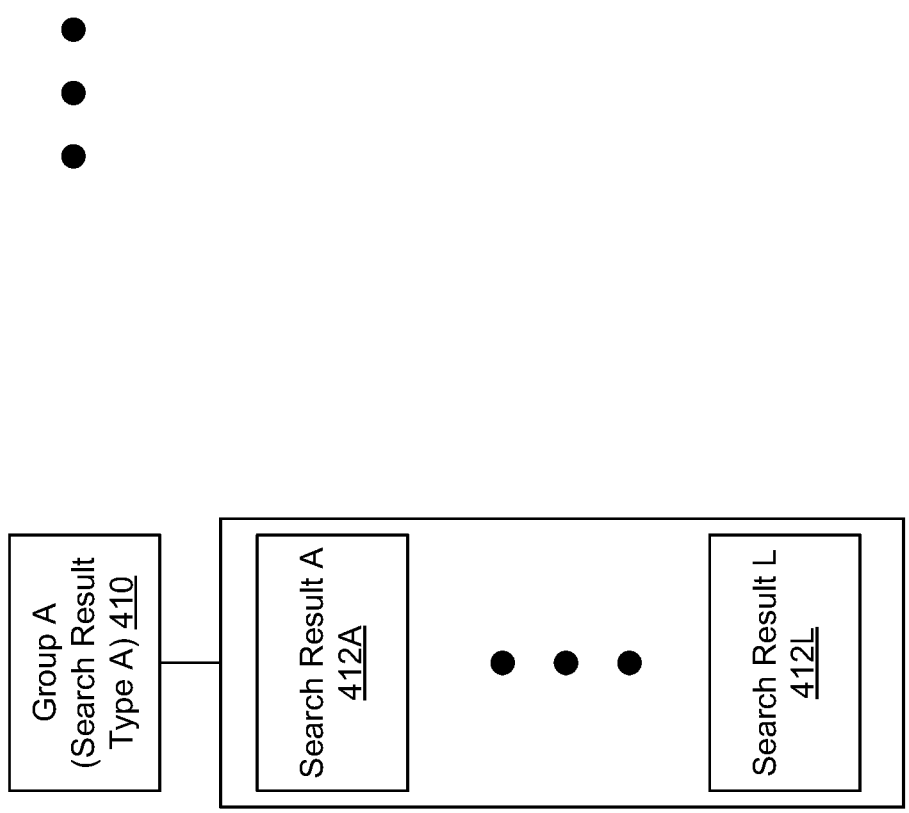

FIG. 4 illustrates an example of associating search results with groups based on types of the search results, according to embodiments of the present disclosure. In an example, a computer system may determine search results from a plurality of data sources. Each search result may have a search result type depending on, for instance, the data source from which the search result may be retrieved. The computer system may group the search results into logical groups, referred to herein as "search result groups" based on the search result types. In this way, each search result group may logically contain one or more search results of a same search result type. The search result groups may be used to organize the presentation of the search results, where the presentation instructions may be generated based on such groups as further described in connection with the next figures.

In an example, a search result group corresponds to a search result type. Search results of the search result type may be associated with the search result group. The associations may be stored in a data structure, such as look-up table, identifying each search result and the search result group.

As illustrated in FIG. 4, a plurality of search result groups may be defined (shown as "K" groups starting with "group A 410" and ending with "group K 420," where "group A 410" corresponds to "search result type A" and "group K 420" corresponds to "search result type K"). For instance, "group A 410" may corresponds to search results returned from an electronic platform and being for catalog items, whereas "group K 420" may correspond to search results returned from a social media platform and being for social media messages.

The search results may be associated with the search result groups, where the associations may be one-to-one. However, other types of associations may be possible including one-to-many and many-to-one depending on whether a search result has multiple search types and whether a search group corresponds to multiple search result types.

Accordingly, a plurality of search results having the "search result type A" may be associated with the "group A 410" (shown as "L" search results starting with "search result A 412A" and ending with "search result L 412L"). Similarly, a different number of search results having the "search result type K" may be associated with the "group K 420" (shown as "M" search results starting with "search result A' 422A" and ending with "search result M' 422M"). For instance, each of the "search result A 412A" to "search result L 412L" may be for a particular catalog item. In comparison, each of the "search result A' 422A" to "search result M' 422M" may be for a particular social media message.

Figure 5:
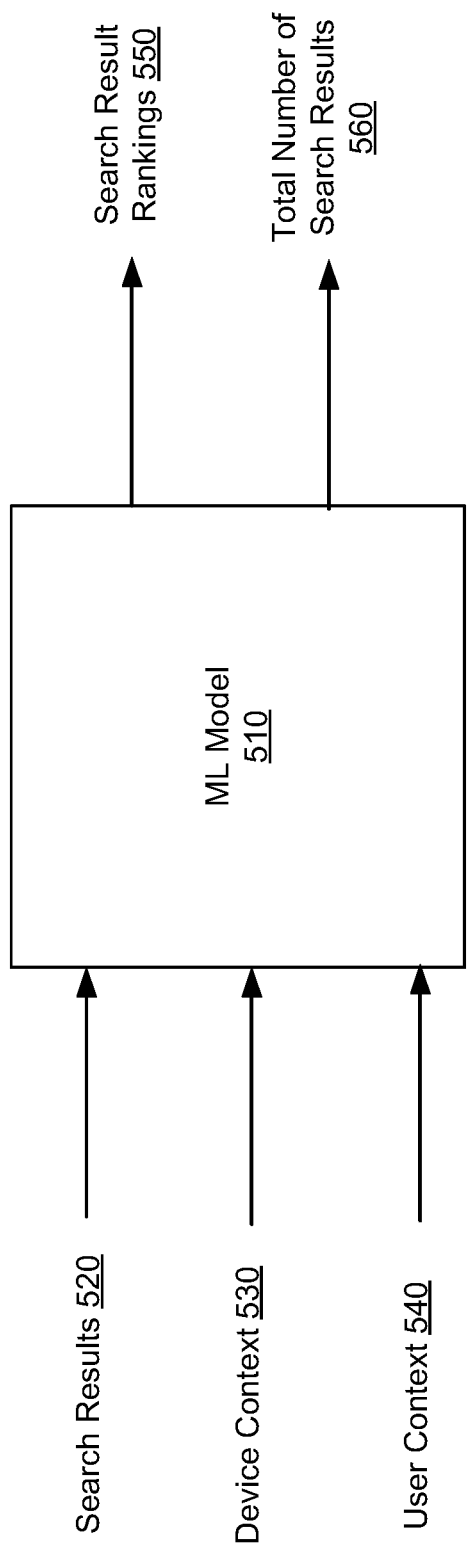
FIG. 5 illustrates an example of a machine learning model that supports natural language searches, according to embodiments of the present disclosure.

FIG. 5 illustrates an example of a ML model 510 that supports natural language searches, according to embodiments of the present disclosure. The ML model 510 may be an example of the ML model 252 of FIG. 2. As illustrated, search results 520, a device context 530, and a user context 530 may be input to the ML model 510. The ML model 510 may be trained to output search result rankings 550 and/or total number of search results 560 to present.

A ranking may indicate a relative of a search result 520. For instance, if a first search result has a higher ranking than a second search result, the first result may be of likely greater interest than the second result. The ranking may be a numerical score, where the ML model 510 may be implemented as a deep neural network. The ranking may alternatively be a qualitative indicator (e.g., high, medium, low), where the ML model 510 may be implemented as a classifier.

In an example, the search results 520 may be logically contained in search result groups, as described in connection with FIG. 4. In this case, the search result groups may be input to the ML model 510. The ML model 510 may output a ranking for each search group and a ranking for each search result in each search group. In addition, the total number of search results 560 may be output for each search group. For instance, and referring back to the example illustrated in FIG. 4, the "group A 410" may have a higher ranking than the "group K 420." Within the "group A 410," the "search result A 412A" may have a higher ranking than the "search result L 412L." In addition, the total number of search results 560 may indicate that only five (or some other number) of the search result groups are to be presented and that only two (or some other number) of search results within the "group A 410" are to be presented.

In an example, the ML model 510 may be trained offline. The training may be supervised, where search results, device contexts, and user contexts may be used as variables, and labeled search result rankings and labeled total number of search results may be used as ground truth. Once trained, the ML model 510 may be deployed. Over time, interactions of the users with the search results surfaced based on the output of the ML model 510 may be collected. The interactions may indicate, for instance, whether the search results were reviewed or dismissed by the user. The ML model 510 may be updated based on batch processing of the collected interactions.

In an example, the ML model 510 may be continuously trained in an online mode. For instance, the ML model 510 may be implemented as a reinforcement neural network. The interactions with search results may be fed back to the reinforcement neural network for refinement of parameters (e.g., weight of connections between neural nodes) of this model.

Other variations to the ML model 510 may be possible. For instance, rather than being trained to output search result rankings 550 and a total number of search results 560, the ML model 510 may be trained to output a score per search result and/or per search result group indicating which result/group to feature for presentation. An aggregation system may receive the scores to then rank the search results and search result groups and may use one or more thresholds to determine the total number of search results to present. For instance, if a score of a search result is less than a first predefined threshold, the aggregation system may determine that this search result should not be presented. If the number search results to present is larger than a second predefined threshold, the aggregation system may determine that only a subset of these search results should be presented (e.g., the ones having the highest score).

Figure 6:
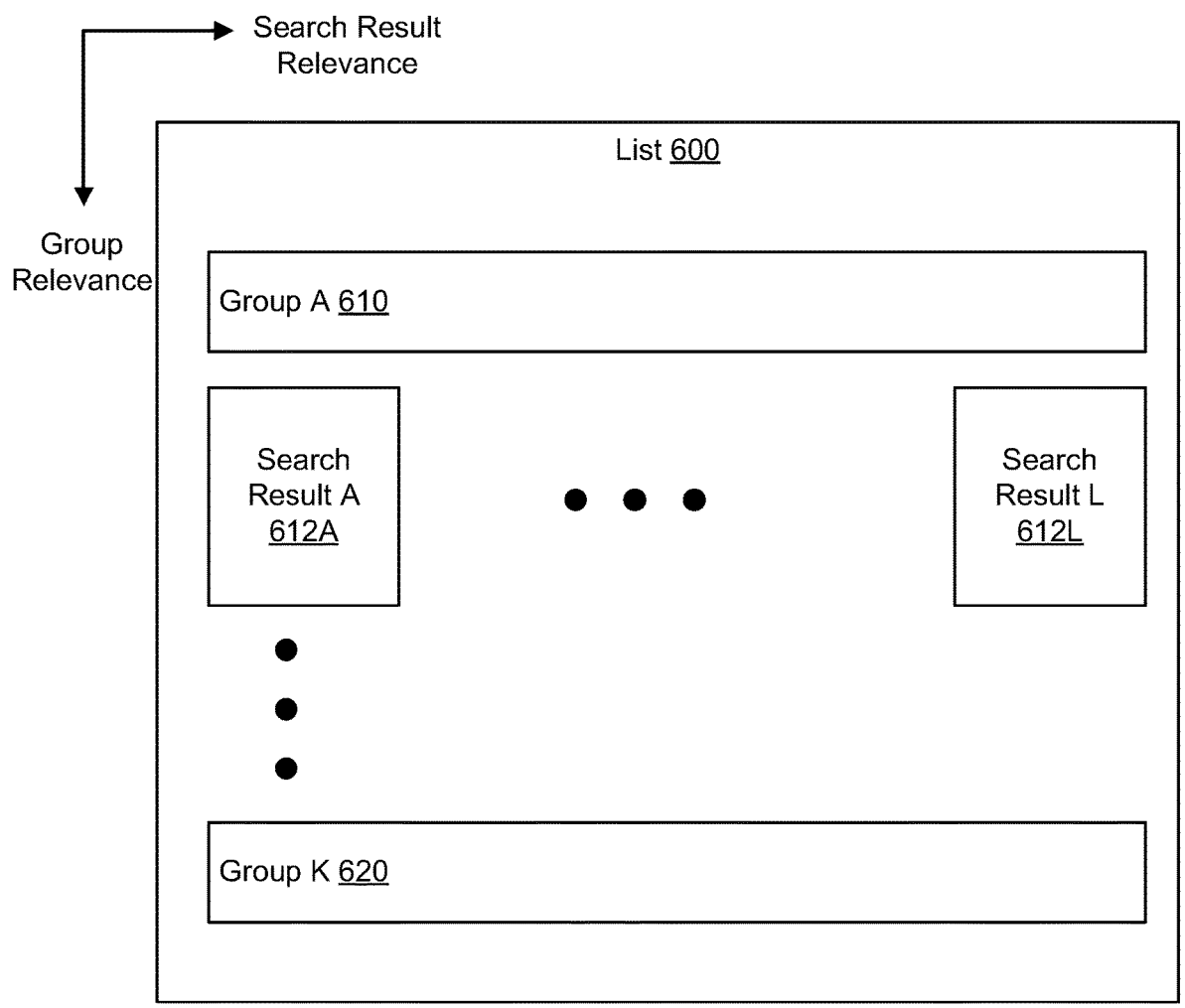
FIG. 6 illustrates an example of organizing search results and associated groups for presentation, according to embodiments of the present disclosure.

FIG. 6 illustrates an example of organizing search results and associated groups for presentation, according to embodiments of the present disclosure. In an example, the search results and search result groups may be organized in a data structure (illustrated in FIG. 6 as a list 600) based on their rankings, where the data structure may be used to generate presentation instructions including for voice-based presentations and/or GUI presentations.

For illustrative purposes, the rankings are shown along the vertical and horizontal axes, although other ways to define the data structure may be possible. The search result groups may be ranked vertically in a descending order from top to bottom based on the rankings of the search groups as output by a ML model, where the lower the search result group is, the lower the interest of the search result group is likely to a user. The search results may be ranked horizontally in a descending order from left to right based on the rankings of the search results as output by the ML model, where the more to the right the search result is, the lower the search result is likely to the user. Search results and search groups that were identified based on querying to the data sources but not included in the list 600 may not be presented. Such may be the case because of low rankings and/or of the total number of search groups and search results to present.

As illustrated, the list 600 may identify a plurality of search result groups (shown as "group A 610" to "group K 620"). The first search result group may be ranked higher than the next search result group and so on and so forth until the last search result group.

Under the "group A 610" (and similarly under each of the other search result groups), the list 600 may identify multiple search results that are to be presented (shown as "search result A 612A" to "search result L 612L"). The "search result A 612A" may be ranked higher than the next one, and so on and so forth until the "search result L 612L." Although FIG. 6 illustrates search result groups each including one or more search results, a search result group may be empty, thereby indicating that this search result group may be of interest but no featured results were retrieved.

Presentation instructions may be generated based on the list 600. For instance, the presentation instructions may indicate that the "group A 610" is to be presented prior to the next ranked search result group, and so on and so forth. The presentation instructions may also indicate that, in connection with the "group A 610," the "search result A 612A" is to be presented prior to the next ranked search result, and so on and so forth.

Figure 7:
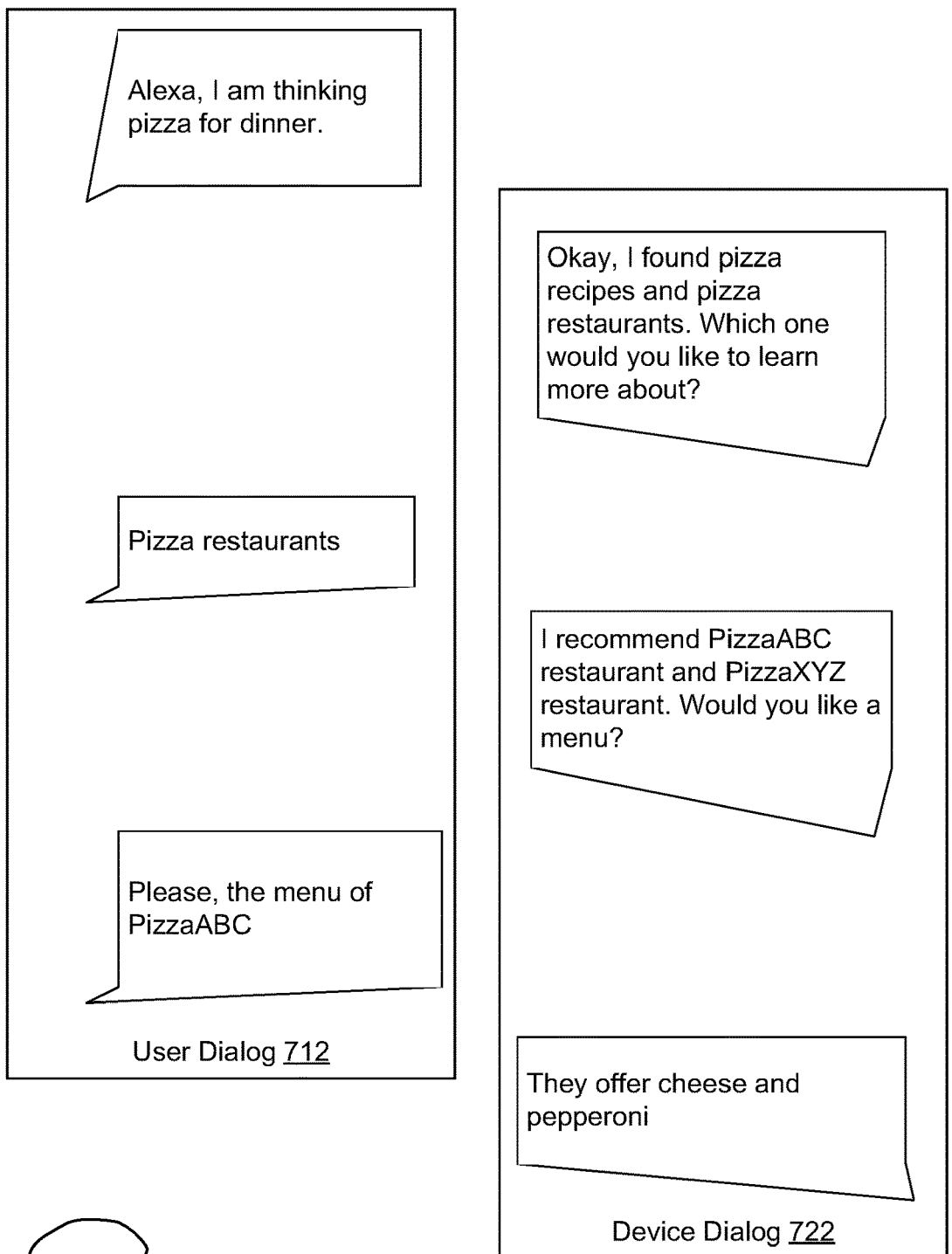
FIG. 7 illustrates an example of a voice-based presentation of search results in response to a natural language search, according to embodiments of the present disclosure.
Figure 7:
Figure 7:
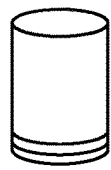

FIG. 7 illustrates an example of a voice-based presentation of search results in response to a natural language search, according to embodiments of the present disclosure. As illustrated, a user 710 may interact with a computing device 720. A voice-based interface of the computing device 720 may facilitate the interactions. In particular, the voice-based interface may receive natural language utterances of the user 710 and present TTS messages back. In FIG. 7, the natural language utterances and the TTS messages are shown as a user dialog 712 and a device dialog 722, respectively.

In an example, the user dialog 712 may include an initial natural language utterance that may correspond to a user search (e.g., shown in FIG. 7 as "Alexa, I am thinking pizza for dinner"). In response, the computing device 720 may send the corresponding NL data to a computer system, such as the computer system 210 of FIG. 2, and may receive a response back from the computer system. The response may include search results and presentation instructions. The search results may be associated with search result groups. The presentation instructions may be based on or include a data structure indicating a total number of search groups to present, a total number of search results per search result group to present, and an order in which the search result groups and the search results within each of such groups are to be presented.

Accordingly, the device dialog 722 may include an initial TTS message that may correspond to the featured group(s) and/or the featured result(s). In the illustration of FIG. 7, the initial TTS message may identify the two (or some other total number) featured result groups (pizza recipes and pizza restaurants) and may ask the user to select one of them.

The user may respond with another natural language utterance (e.g., shown in the user dialog 712 as "pizza restaurants"). Rather than having to submit a new search to the computer system, the computing device 720 may determine that this natural language utterance is associated with one of the two search groups (e.g., pizza restaurants) and may present next the two (or some other total number) featured results about pizza restaurants (shown in the device dialog 722 as "I recommend PizzaABC restaurant and PizzaXYZ restaurant. Would you like a menu?").

Similarly also here, the user may respond with another natural language utterance selecting a search result (e.g., Please, the menu of PizzaABC"). In turn, the computing device 720 may present detailed data from the selected search result (shown in the device dialog 722 as "They offer cheese and pepperoni").

Although FIG. 7 illustrates that the response may include the search results and presentation instructions such that a computing device can store the response locally and may use the included search results and presentation instructions to drive the user interface, embodiments of the present disclosure are not limited as such. For instance, in case the computing device may have limited memory space or limited capability to receive, store, and/or use such responses, a first response may be sent to the computing device and may include the initial TTS message. Upon receiving a user's utterance responding to the initial TTS message, the computing device may send the corresponding NL data to the computer system to receive a second response including a next TTS message, and so on and so forth.

Figure 8:
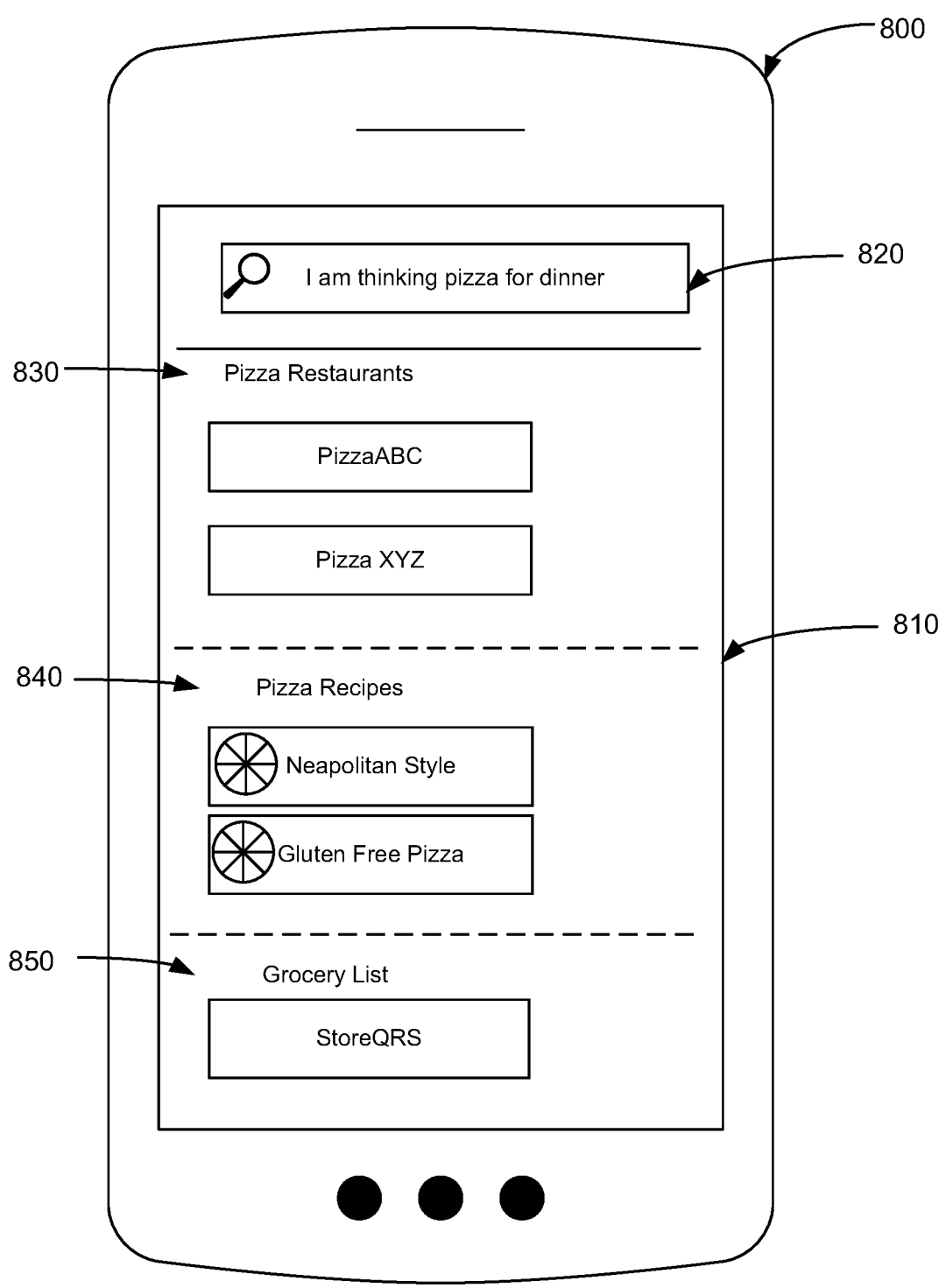
FIG. 8 illustrates an example of a graphical user interface of a computing device for presenting search results in response to a natural language search, according to embodiments of the present disclosure.

FIG. 8 illustrates an example of a GUI 810 of a computing device 800 for presenting search results in response to a natural language search, according to embodiments of the present disclosure. As illustrated, the GUI 810 may include a search input field 820 and multiple search result fields 810, 840, and 850. The search input field 820 may receive natural language input of a user, such as text having a free form. This input may be provided via an input device (e.g., a virtual keyboard presented by the computing device 800 on the GUI 810 or a physical keyboard connected to the computing device 800). Each of the search fields 830, 840, and 850 may correspond to a search result group and may present one or more search results that are associated with the search result group.

In an example, the computing device 800 may receive the natural language input at the search input field 820, may send the corresponding NL data to a computer system, such as the computer system 210 of FIG. 2, and may receive a response back from the computer system. The response may include the search results and presentation instructions. The search results may be associated with the search result groups. The presentation instructions may be based on or include a data structure indicating a total number of search groups to present, a total number of search results per search result group to present, and an order in which the search result groups and the search results within each of such groups are to be presented.

Based on the presentation instructions, the computing device 800 may present the various search result groups and search results on the GUI 810. For instance, the presentation instructions may indicate that a total of three of search result groups are to be presented and may identify these search groups as "pizza restaurants," "pizza recipes," and "grocery list." The presentation instructions may also indicate that under the "pizza restaurants," the search results for "PizzaABC" and "PizzaXYZ" restaurants are to be presented. Accordingly, the search field 830 may correspond to the "pizza restaurants" and may include the two search results. The search field 830 being shown as the first field after the search input field may allow the presentation of the featured result group and associated search results first.

Figure 9:
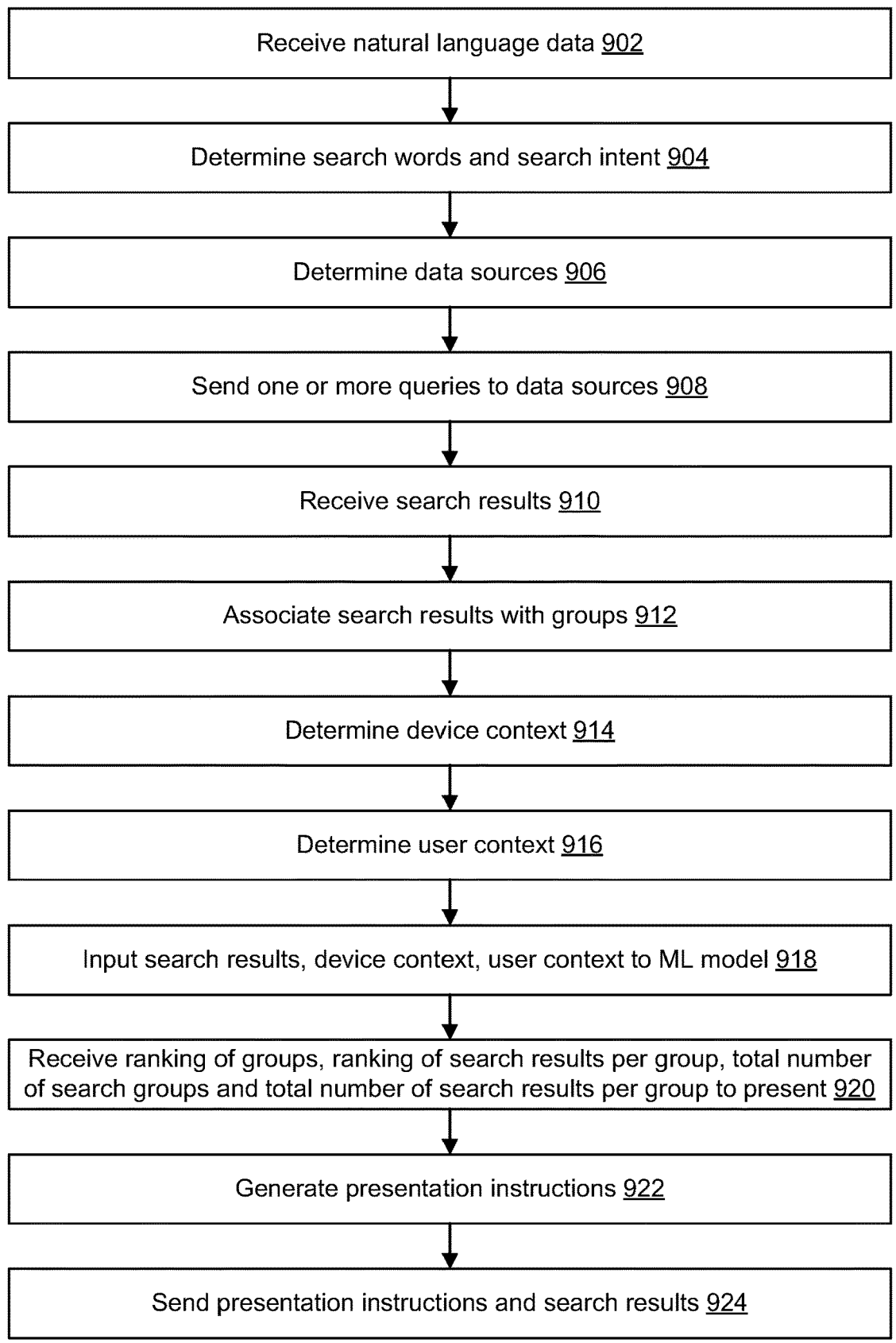
FIG. 9 illustrates an example of a flow for providing natural language searches, according to embodiments of the present disclosure.

FIG. 9 illustrates an example of a flow for providing natural language searches, according to embodiments of the present disclosure. Some or all of instructions for performing the operations of the illustrative flow can be implemented as hardware circuitry and/or stored as computer-readable instructions on a non-transitory computer-readable medium of a computer system, such as the computer system 210 of FIG. 2. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, reordered, and/or performed in parallel.

The flow may start at operation 902, where the computer system may receive natural language data from a computing device. In an example, the natural language data may include audio data corresponding to a user's natural language utterance detected by a microphone of the computing device. The computer system may convert such audio data to text data. In another example, the natural language data may include text data corresponding to a natural language input at a GUI of the computing device. In this example, no speech to text conversion may be needed. In both examples, the natural language data may correspond to a user search for offers about items.

At operation 904, the computer system may determine one or more search words (e.g., a phrase identifying an item or a category of items) and a search intent (e.g., a shopping intent) based on the natural language data. In an example, the computer system may apply ASR and NLU to the text data to determine the search word(s) and the search intent.

At operation 906, the computer system may determine data sources. In an example, all data sources available to the computer system may be selected for querying. In another example, ones of the data sources may be selected based on the search intent. For instance, each of the data sources may be associated with one or more search intents and the selection may be based on matches between the search intent determined at operation 904 with the associated search intents.

At operation 908, the computer system may send one or more queries to the data sources. In an example, a single query may be sent and includes the search word(s). In another example, multiple search queries are defined, one for each of the selected data sources and each including the search word(s) and, possibly, constraints or conditions derived from the NL data (e.g., a time constraint derived from utterance "I am think pizza for dinner," where the time constraint may limit offers for "pizza" that are available within a dinner time frame).

At operation 910, the computer system may receive search results from the queried data sources. In an example, each search result may be associated with a search result type and may include offers about items. The search type of a search result may correspond to the data source from which the search result was returned.

At operation 912, the computer system may associate the search results with search result groups. In an example, each of such groups may correspond to one of the search result types. The computer system may logically group the search results in the search result groups by matching the search result types of the search results with the search result types of the search result groups.

At operation 914, the computer system may determine a device context of the computing device. In an example, the device context may include any of a geographic location, a network address, a type, or a type of user interface of the computing device. The geographic location may include a geographic address (e.g., a street address or approximate coordinates) and/or a type of space (e.g., kitchen, living room, etc.). The geographic address and the type of space may be determined from registration of the computing device under a user account. The geographic location may also be determined in real-time (e.g., relative to when the natural language data is received) based on an call to an IP geolocation service using the IP address of the computing device. The geographic location may also be determined based on signal beaconing or other location identification techniques. The network address may include an IP address of the computing device and may be determined based on IP packets in which the NL data is received. The type of the computing device and the type of the user interface may be determined from the registration information.

At operation 916, the computer system may determine a user context of the user. In an example, the user context may include any of a profile, a recent search activity, a search history, browse history, a user-defined list of items, and/or other activities of the user. For instance, the computer system may determine a user identifier based on the audio data (if such data is received) by deriving a voice print and matching the voice print with one of voice prints stored for users. Additionally or alternatively, the user identifier may be determined from the user account under which the computing device is registered. The computer system may use the user identifier in a look-up to a data store that maintains data about profiles, search activities, search histories, browse histories, and/or other activities of users.

At operation 918, the computer system may input the search results, the device context, and the user context to one or more ML models. In an example, the search result groups and the associated search results are input to the ML model(s) such that the ML model(s) may rank the search groups relative to each other and rank the search results within each group. In this operation, multiple ML models may be available. The computer system may select a subset of the ML models to use and may input the search results, the device context, and the user context to the selected subset. The selection may be performed by matching the search intent, items (or search words), and/or the determined data sources with uses of the ML models.

At operation 920, the computer system may receive a ranking of the search result groups, a ranking of the search results per search result group, a total number of search groups to present, and/or a total number of search results per search result group to present. In an example, such data may be an output of the ML model(s).

At operation 922, the computer system may generate presentation instructions based on the rankings and total numbers. In an example, the presentation instructions may identify the search result groups and the search results within each of such groups that are to be presented and an order in which the search result groups and their search results are to be presented. In addition, the computer system may generate a data structure that represents the presentation instructions, where the data structure may include identifiers of the search result groups and search results to be presented and the order of presentation.

At operation 924, the computer system may send the presentation instructions and search results to the computing device. As explained herein above, the presentation instructions and the search results may also or alternatively be sent to a different computing device. The search results may be presented, as recommended offers and/or features items, at a user interface (voice-based user interface or GUI) of such computing device(s) according to the presentation instructions.

Figure 10:
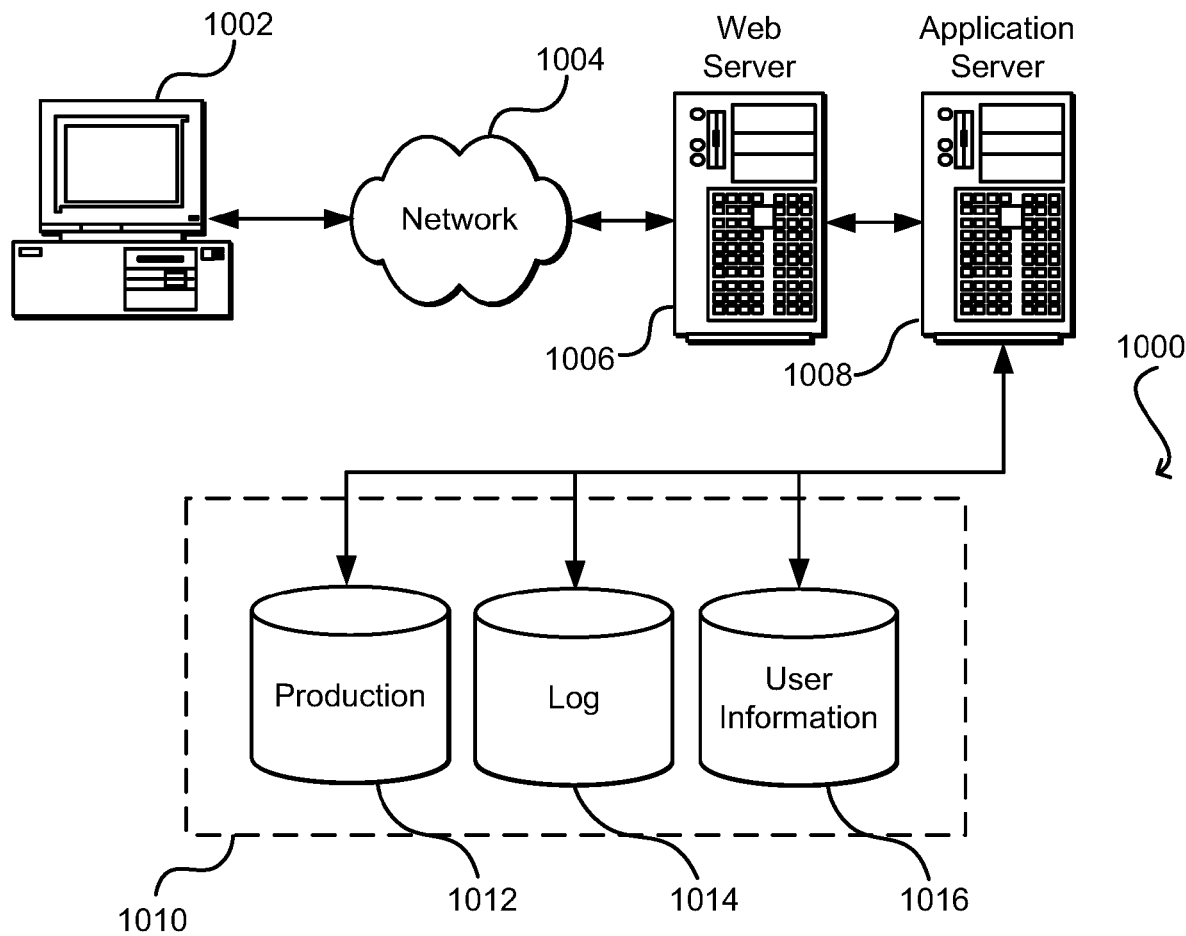
FIG. 10 illustrates an example of a computer architecture diagram, according to embodiments of the present disclosure.

FIG. 10 illustrates an example of a computer architecture diagram, according to embodiments of the present disclosure. This architecture may be used to implement some or all of the computer systems described herein.

The computer 1000 includes a baseboard 1002, or "motherboard," which is a printed circuit board to which a multitude of components or devices may be connected by way of a system bus or other electrical communication paths. In one illustrative embodiment, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a random access memory ("RAM") 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the embodiments described herein.

The computer 1000 may operate in a networked environment using logical connections to remote computing devices and computer systems through a network, such as the local area network 1020. The chipset 1006 may include functionality for providing network connectivity through a NIC 1012, such as a gigabit Ethernet adapter. The NIC 1012 is capable of connecting the computer 1000 to other computing devices over the network 1020. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store system programs, application programs, other program modules, and data, which have been described in greater detail herein. The mass storage device 1018 may be connected to the computer 1000 through a storage controller 1014 connected to the chipset 1006. The mass storage device 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage, and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular unit in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1018 may store an operating system 1030 utilized to control the operation of the computer 1000. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1018 may store other system or application programs and data utilized by the computer 1000. The mass storage device 1018 might also store other programs and data not specifically identified herein.

In one embodiment, the mass storage device 1018 or other computer-readable storage media is encoded with computer-executable instructions which, when loaded into the computer 1000, transforms the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various routines described above. The computer 1000 might also include computer-readable storage media for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10. It should also be appreciated that many computers, such as the computer 1000, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer system, comprising:
   one or more processors; and
   one or more memories storing computer-readable instructions that, upon execution by the one or more processors, configure the computer system to:
   receive, from a computing device and based at least in part on a voice interface of the computing device, data corresponding to a natural language utterance of a user, the natural language utterance indicating a user search for one or more items;
   determine, based at least in part on natural language processing of the data, a search word indicating the one or more items and a search intent indicating a request for offers about the one or more items;
   determine, based at least in part on the search intent, a plurality of data sources each of which associated with a different search result type for the offers;
   receive, based at least in part on a query that comprises the search word, search results from a data source of the plurality of data sources, the search results having a search result type that is associated with the data source and comprising an offer for an item;
   associate the search results with a search result group having the search result type;
   determine a device context of the computing device, the device context comprising a geographic location of the computing device;
   determine a user context of the user, the user context comprising a search activity associated with the user and completed within a predefined time period from the receiving of the data;
   input the device context, the user context, and the search results to a machine learning model;

determine based at least in part on an output of the machine learning model, a first ranking of search result groups that comprise the search result group, the first ranking indicated by the output;

determine based at least in part on the output of the machine learning model, a second ranking of the search results in the search result group, the second ranking indicated by the output;

generate, based at least in part on the first ranking, and the second ranking, and a total number of search results, instructions associated with presenting the search result groups and the search results at the voice interface of the computing device; and send the instructions to the computing device.

2. The computer system of claim 1, wherein the one or more memories store further computer-readable instructions that, upon execution by the one or more processors, additionally configure the computer system to select the machine learning model from a plurality of machine learning model based at least in part on the search intent.

3. The computer system of claim 1, wherein the device context further comprises first data indicating a presentation modality of the computing device, and wherein the user context further comprises second data indication a profile of the user, a search history of the user, and a browse history of the user.

4. The computer system of claim 1, wherein the query further comprises a constraint determined based at least in part on the natural language processing of the data, wherein the plurality of data sources comprises an electronic platform, an application store, and a web site, wherein the electronic platform stores a catalog of items available from the electronic platform, wherein the application store stores an application available to obtain the item from the electronic platform or from a different source, and wherein the web site stores data about an entity associated with the item and the geographic location.

5. The computer system of claim 1, wherein the one or more memories store further computer-readable instructions that, upon execution by the one or more processors, additionally configure the computer system to:

determine based at least in part on the output of the machine learning model, a total number of search results to present in the search result group, the total number indicated by the output, wherein the instructions indicate that a presentation of results of the search result group cannot use more than the total number.

6. A method implemented by a computer system, comprising:

receiving a search for one or more items, the search associated with a computing device;

determining, based at least in part on the search, first search results from a first data source and associated with a first search result type, the first search results comprising a first offer for a first item;

determining, based at least in part on the search, second search results from a second data source and associated with a second search result type, the second search results comprising a second offer for a second item, the second search result type being different from the first search result type;

determining a context associated with at least one of the computing device or a user of the computing device;

inputting, to one or more machine learning models, the context, the first search results, and the second search results;

generating, based at least in part on an output of the one or more machine learning models, instructions associated with a presentation of the first search results and the second search results at a user interface of the computing device, the instructions indicating a first presentation order of the first search results and the second search results and a second presentation order of search results within the first search results; and sending the instructions to the computing device.

7. The method of claim 6, wherein the user interface comprises a voice interface, and wherein receiving the search comprises:

receiving, from the computing device and based at least in part on the voice interface, data corresponding to a natural language utterance of the user;

determining, based at least in part on natural language processing of the data, a search word indicating an item and a search intent indicating a request for an offer about the item, and wherein determining the first search results comprises:

determining, based at least in part on the search intent, a plurality of data sources that comprise the first data source and the second data source and storing data about offers for the item; and receiving, based at least in part on a query that comprises the search word, the first search results from the first data source.

8. The method of claim 7, further comprising:

associating the first search results with a first search result group based at least in part on the first search result type and the second search results with a second search result group based at least in part on the second search result type;

generating, based at least in part on the context, a first ranking of the first search result group and the second search result group; and generating, based at least in part on the context, a second ranking of the first search results in the first search result group, wherein the first presentation order is based at least in part on the first ranking, and wherein the second presentation order is based at least in part on the second ranking.

9. The method of claim 6, further comprising:

determining a search intent based at least in part on user input indicating the search; and selecting a machine learning model of the one or more machine learning models based at least in part on the search intent.

10. The method of claim 6, further comprising:

associating the first search results with a first search result group based at least in part on the first search result type and the second search results with a second search result group based at least in part on the second search result type;

inputting, to a machine learning model of the one or more machine learning models, the context, the first search results, and the second search results; and determining, based at least in part on an output of the machine learning model, a first ranking of the first search result group and the second search result group and a second ranking of the first search results in the first search result group, wherein the first presentation order is based at least in part on the first ranking, and wherein the second presentation order is based at least in part on the second ranking.

11. The method of claim 10, further comprising:

determining, based at least in part on the output of the machine learning model, a first number of search result groups to present and a second number of search results within the first search result group to present, wherein the instructions comprise the first number and the second number.

12. The method of claim 6, wherein the context indicates at least one of a geographic location of the computing device or a type of the user interface, and further comprising:
   inputting, to a machine learning model, the at least one of the geographic location of the type of the user interface, wherein the instructions are generated based at least in part on an output of the machine learning model.

13. The method of claim 6, wherein the context indicates at least one of a profile of the user, a search history of the user, a browse history of the user, or a user-defined list of items, and further comprising:
   inputting, to a machine learning model, the at least one of the profile, the search history, the browse history, or the user-defined list of items, wherein the instructions are generated based at least in part on an output of the machine learning model.

14. The method of claim 6, wherein the context indicates a history of user interactions with past presentations of search results, and further comprising:
   inputting, to a machine learning model, the at least one of the history, wherein the instructions are generated based at least in part on an output of the machine learning model.

15. One or more non-transitory computer-readable storage media storing instructions that, upon execution by a computer system, cause the computer system to perform operations comprising:
   receiving a search for one or more items, the search associated with a computing device;
   determining, based at least in part on the search, first search results from a first data source and associated with a first search result type, the first search results comprising a first offer for a first item;
   determining, based at least in part on the search, second search results from a second data source and associated with a second search result type, the second search results comprising a second offer for a second item, the second search result type being different from the first search result type;
   determining a context associated with at least one of the computing device or a user of the computing device;
   inputting, to one or more machine learning models, the context, the first search results, and the second search results;
   generating, based at least in part on an output of the one or more machine learning models, instructions associated with a presentation of the first search results and the second search results at a user interface of the computing device, the instructions indicating a first presentation order of the first search results and the second search results and a second presentation order of search results within the first search results; and
   sending the instructions to the computing device.

16. The one or more non-transitory computer-readable storage media of claim 15, wherein the context comprises a geographic location of the computing device and a type of the user interface, wherein receiving the search comprises receiving, from the computing device, data corresponding to a natural language utterance of the user, wherein the first search results are determined based at least in part on the data, and wherein the instructions are generated based at least in part on inputting the first search results, the second search results, the geographic location, and the type of the user interface to the one or more machine learning models.

17. The one or more non-transitory computer-readable storage media of claim 15, wherein receiving the search comprises receiving, from a cloud computing service, a search word, a search intent, a type of the computing device, and a user identifier of the user.

18. The one or more non-transitory computer-readable storage media of claim 17, wherein the operations further comprise:
   determining, from a data store, a user profile based at least in part on the user identifier; and
   determining, from the data store, a search activity associated with the user identifier and completed within a predefined time period from the receiving of the search, wherein the context comprises the type of the computing device, the user profile, and the search activity.

19. The one or more non-transitory computer-readable storage media of claim 18, wherein the operations further comprise:
   inputting the type of the computing device, the user profile, and the search activity to the one or more machine learning models, wherein the instructions are generated based at least in part on the output of the one or more machine learning models.

20. The one or more non-transitory computer-readable storage media of claim 15, wherein the operations further comprise:
   determining, based at least in part on the output of the one or more machine learning models, a first number of search results to present from the first search results, wherein the instructions indicate the first number of search results.

* * * * *